US009766947B2

(12) United States Patent
Wang et al.

(10) Patent No.: US 9,766,947 B2
(45) Date of Patent: Sep. 19, 2017

(54) METHODS AND APPARATUS TO MONITOR SERVER LOADS

(75) Inventors: Wei Wang, New York, NY (US); Charles Shen, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 554 days.

(21) Appl. No.: 13/168,650

(22) Filed: Jun. 24, 2011

(65) Prior Publication Data

US 2012/0331127 A1     Dec. 27, 2012

(51) Int. Cl.
| | |
|---|---|
| G06F 15/173 | (2006.01) |
| G06F 9/50 | (2006.01) |
| G06F 9/48 | (2006.01) |
| G06F 9/455 | (2006.01) |

(52) U.S. Cl.
CPC ........ G06F 9/5083 (2013.01); G06F 9/45558 (2013.01); G06F 9/4862 (2013.01); G06F 9/5027 (2013.01); G06F 9/5088 (2013.01)

(58) Field of Classification Search
CPC .... G06F 9/5088; G06F 9/5077; G06F 9/5083; G06F 9/4862; G06F 9/5027; G06F 9/45558; G06F 3/0605; G06F 3/0635; G06F 3/0659
USPC ................................................ 709/224, 226
See application file for complete search history.

(56) References Cited

U.S. PATENT DOCUMENTS

| | | | |
|---|---|---|---|
| 6,647,422 B2 | 11/2003 | Wesinger, Jr. et al. | |
| 6,883,028 B1 * | 4/2005 | Johnson et al. | 709/226 |
| 7,448,079 B2 | 11/2008 | Tremain | |
| 7,496,651 B1 | 2/2009 | Joshi | |
| 7,599,941 B2 | 10/2009 | Bahar et al. | |
| 7,657,629 B1 | 2/2010 | Kommula | |
| 2005/0160133 A1 * | 7/2005 | Greenlee et al. | 709/200 |
| 2006/0112170 A1 * | 5/2006 | Sirkin | 709/217 |
| 2008/0104608 A1 * | 5/2008 | Hyser et al. | 718/105 |
| 2008/0225718 A1 | 9/2008 | Raja et al. | |
| 2009/0172666 A1 * | 7/2009 | Yahalom et al. | 718/1 |
| 2009/0300407 A1 | 12/2009 | Kamath et al. | |
| 2010/0131639 A1 | 5/2010 | Narayana et al. | |
| 2010/0131960 A1 | 5/2010 | Suganthi et al. | |
| 2010/0153558 A1 | 6/2010 | Kommula et al. | |
| 2010/0228819 A1 | 9/2010 | Wei | |
| 2010/0251370 A1 * | 9/2010 | Sun et al. | 726/23 |
| 2010/0274890 A1 * | 10/2010 | Patel et al. | 709/224 |

(Continued)

OTHER PUBLICATIONS

Hajek, "Performance of Global Load Balancing by Local Adjustment," IEEE Transactions on Information Theory, vol. 36, No. 6, pp. 1398-1414, Nov. 1990.

*Primary Examiner* — Philip Chea
*Assistant Examiner* — Mohammed Ahmed
(74) *Attorney, Agent, or Firm* — Hanley, Flight & Zimmerman, LLC

(57) ABSTRACT

Methods and apparatus to monitor server loads are disclosed. An example load monitor includes a first virtual machine to replicate a first server; a router interface to cause a router to redirect a portion of requests destined for the first server to the first virtual machine, the first virtual machine to serve the redirected requests; a collector to collect first metric data from the first virtual machine related to processing of the redirected requests; and an overload indicator to indicate an overload condition at the first server based on the first metric data collected from the first virtual machine.

20 Claims, 7 Drawing Sheets

(56) References Cited

U.S. PATENT DOCUMENTS

2010/0332657 A1* 12/2010 Elyashev et al. ............. 709/226
2011/0023114 A1    1/2011 Diab et al.
2011/0106949 A1*  5/2011 Patel et al. .................... 709/226
2011/0276679 A1* 11/2011 Newton et al. ............... 709/224

* cited by examiner

METHODS AND APPARATUS TO MONITOR SERVER LOADS

FIELD OF THE DISCLOSURE

This disclosure relates to computing networks and, more particularly, to methods and apparatus to monitor server loads.

BACKGROUND

Networked computing devices, such as servers, receive requests from client devices, for data, processing tasks, permission to utilize an application of the server, etc. Each request received at a server imposes a processing load on that server. The processing load placed on the server is monitored to determine, for example, whether the server is overloaded.

DETAILED DESCRIPTION

Figure 1:
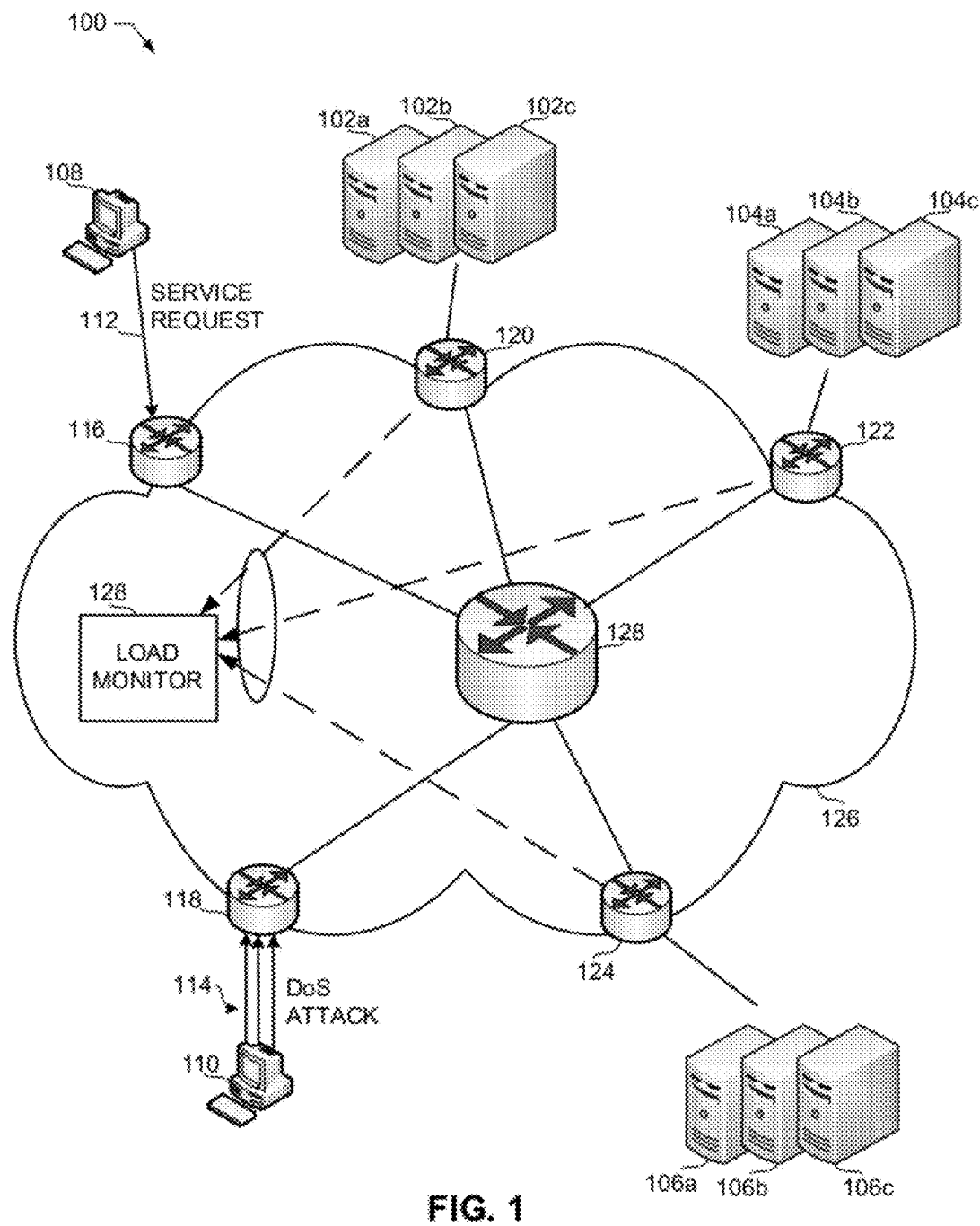
FIG. 1 illustrates an example network including an example load monitor disclosed herein.

To facilitate exchanges of data between devices, computing networks operate according to one or more protocols. Many of the protocols utilized by computing networks, such as the Hypertext Transfer Protocol (HTTP), involve conveyance of a request from a first device over the network to a second device that responds to the request by, for example, returning content. For example, a requesting device (referred to herein as a client device), such as a personal computer utilizing a web browser, can send request(s) over one or more networks (e.g., the Internet) to a server implementing a web site and/or a program to be utilized by the client device. The server processes the request(s) and sends one or more messages to the client device indicating that, for example, the request(s) have been serviced, that the server is unavailable, that requested data is being conveyed to the client device, etc. Processing the requests consumes resources of the server (e.g., dynamic and/or static memory, clock cycles, processor capabilities, etc.). The amount of server resources consumed and the amount of time those resources are consumed by a particular request depends on, for example, compatibility of the server with the type of the request, processor speeds of the server, available memory on the server, complexity of the requests (e.g., a request for stored data is less complex to process than a request to execute an application using input sent with the request), an amount of data to be transmitted to the client device as part of servicing the request, etc. Therefore, the processing load placed on the server during a period of time depends on, for example, an amount of requests received, the type(s) of the requests received, the ability of the server to service the type(s) of requests received, and/or other processing tasks that the server performs in addition to the received requests.

As the processing load placed on the server increases beyond one or more levels during a period of time, the ability of the server to meet requests in accordance with performance expectations is adversely affected. In other words, if the processing load placed on the server exceeds a threshold, the performance of the server suffers until the processing load is reduced below the threshold. Therefore, the processing load placed on a server is often monitored to determine whether such a load threshold has been exceeded. If the threshold is exceeded, other servers may temporarily service some requests for the overloaded server until the processing load on the overloaded server is reduced.

Known monitoring systems typically rely on agent(s) installed on the monitored server(s) to collect information related to a processing load placed on the server(s). That is, each server to be monitored hosts one or more monitoring agents. The monitoring agent(s) send the collected information to one or more monitoring entities (e.g., a central machine and/or a terminal utilized by a monitoring technician) charged with monitoring the servers such that the monitoring entities can utilize the collected information. The monitoring entities are configured to operate in cooperation with the monitoring agents installed on the servers.

In these known monitoring systems, the monitoring agents installed on the server and the monitoring entities are limited to communicating according to a specific protocol as data is exchanged with one or more networks. For example, the Simple Network Management Protocol (SNMP) is used by some monitoring systems to monitor a group of servers. SNMP is based on extensible management information bases (MIBs), which define the structure of the collected information to be provided to the monitoring entities. Moreover, resources of the server(s) on which the monitoring agent(s) are installed are consumed by the monitoring agent(s), thereby reducing the capacity of the corresponding server(s). Moreover, for these known monitoring systems to be updated (e.g., to incorporate additional or alternative factors into a processing load analysis), each instance of the monitoring agent(s) and the monitoring entities (e.g., a user interface and/or a communication interface of a central machine) must be updated on both the server(s) and the machine(s) hosting the monitoring entities. Such known monitoring systems also require such across-the-board updates when additional or alternative types of information are to be collected and/or reported. The server(s) having monitoring agent(s) installed thereon are also burdened each time the monitoring agent(s) and/or a related device(s) and/or program(s) malfunction. The maintenance needed to address such a malfunction consumes server resources and/or may interfere with normal operations of the server.

Example methods, apparatus, and articles of manufacture disclosed herein enable a collection of processing load information related to a server without installing a monitoring agent on the server. Thus, in contrast to previous monitoring systems, example methods, apparatus, and articles of manufacture disclosed herein do not consume resources of a server to be monitored with a monitoring agent and the installation, operation, maintenance, correction, etc. of the monitoring agent. Instead, example methods, apparatus, and articles of manufacture disclosed herein generate a virtual machine for each server of a network to be monitored. In such examples, the virtual machine is a virtual replica of the respective server. The examples disclosed herein redirect a sample (e.g., a percentage such as ten percent) of traffic destined for a server to the corresponding virtual machine, which services the redirected traffic in a similar fashion as the server. Such examples then collect metric data related to the processing load placed on the virtual machine when processing the redirected traffic. Such examples use the processing load information collected from the virtual machines to infer processing load data related to the servers (e.g., whether any of the servers is or may imminently become overloaded). Thus, example methods, apparatus, and articles of manufacture disclosed herein monitor processing loads of servers without burdening the servers with monitoring agents that consume server resources and require maintenance. Additional aspects and advantages of the examples disclosed herein are described below.

FIG. 1 illustrates an example system 100 implemented in accordance with the teachings disclosed herein. The example system 100 of FIG. 1 includes a first server site having a plurality of servers 102a-c, a second server site having a plurality of servers 104a-c, and a third server site having a plurality of servers 106a-c. The example servers at the server sites 102-106 of FIG. 1 can be configured and/or programmed to operate independently from one another. Additionally, the servers at the server sites 102-106 can be configured and/or programmed to operate in conjunction with each other when, for example, a highly demanding processing request is received at one of the servers and/or when one or more of the servers becomes overloaded. For example, a first processing task can be serviced by a first server 102a, a second processing task can be serviced by the first server 102a and by a second server 102b, and a third processing task originally destined for the first server 102a can be redirected to a third server 104a. The configurations described herein are for purposes of illustration, as many different configurations are available to service requests received at the server sites 102-106.

The example server sites 102-106 of FIG. 1 receive requests from one or more devices communicatively coupled thereto. The requesting devices are sometimes referred to herein as client devices. The requests may be any type of message such as, for example, HTTP (Hyper Text Transfer Protocol) requests, GET messages, PUT messages, or any other type of message sent in accordance with any past, present or future protocol. The example of FIG. 1 includes a first client device 108 and a second client device 110, although the system 100 may include additional devices that send requests to the server sites 102-106. In the illustrated example, the first and second client devices 108 and 110 are end user devices such as, for example, personal computers, mobile phones, wireless communicators (e.g., personal digital assistants), portable media players (e.g., mobile video players, portable MP3 players), tablet computers, (e.g., an iPad®), etc. In some examples, the server sites 102-106 receive requests from additional or alternative devices, such as other servers, switching devices, security or authentication devices, etc. The first client device 108 is shown in FIG. 1 as conveying a service request 112 destined for the first server site 102. The second client device 110 is shown in FIG. 1 as conveying a denial of service (DoS) attack 114 destined for the second server site 104. Example implementations of the service request 112 and the DoS attack 114 shown in FIG. 1 are described in detail below.

The example client devices 108 and 110, as well as the server sites 102-106 of FIG. 1 are each communicatively coupled to a corresponding edge router 116-124. The edge routers 116-124 route network traffic through a network 126 that includes a core router 128. The example network 126 of FIG. 1 can be implemented by any suitable type of network and/or combination of networks such as, for example, a local-area network, a wide-area network, a metropolitan-area network, the Internet, a digital subscriber line (DSL) network, a cable network, a power line network, a wireless communication network, a wireless mobile phone network, a Wi-Fi network, and/or a satellite network. The edge routers 116-124 route data across the network 126 in cooperation with the core router(s) 128 according to one or more past, present, and/or future protocols (e.g., Ethernet switching, Internet protocol, etc.). For example, the service request 112 may be an HTTP request addressed to a server 102a of the first server site 102. The service request 112 is conveyed to the corresponding edge router 116, which analyzes a header of the service request 112 and routes the request 112 to the server 102a via the network 126, perhaps through the core router 128. The network 126 may include additional routing elements than those shown in FIG. 1 and the service request 112 may be routed by the additional routing elements. In the illustrated example, the server 102a receives the request, processes the request, and sends a response to the client device 108 via the network 126.

The example system 100 of FIG. 1 includes an example load monitor 128. The example load monitor 128 generates and utilizes virtual machine replicas of the servers of the service sites 102-106 to monitor the servers of the service sites 102-106. As described in greater detail below, the example load monitor 128 of FIG. 1 monitors processing loads placed on the server sites 102-106 unobtrusively without installing a monitoring agent on each of the servers to be monitored. Instead, the example load monitor 128 of FIG. 1 infers processing load information for the service sites 102-106 from metric data collected from virtual machines configured to serve a sample of the requests destined for the server sites 102-106.

Figure 2:
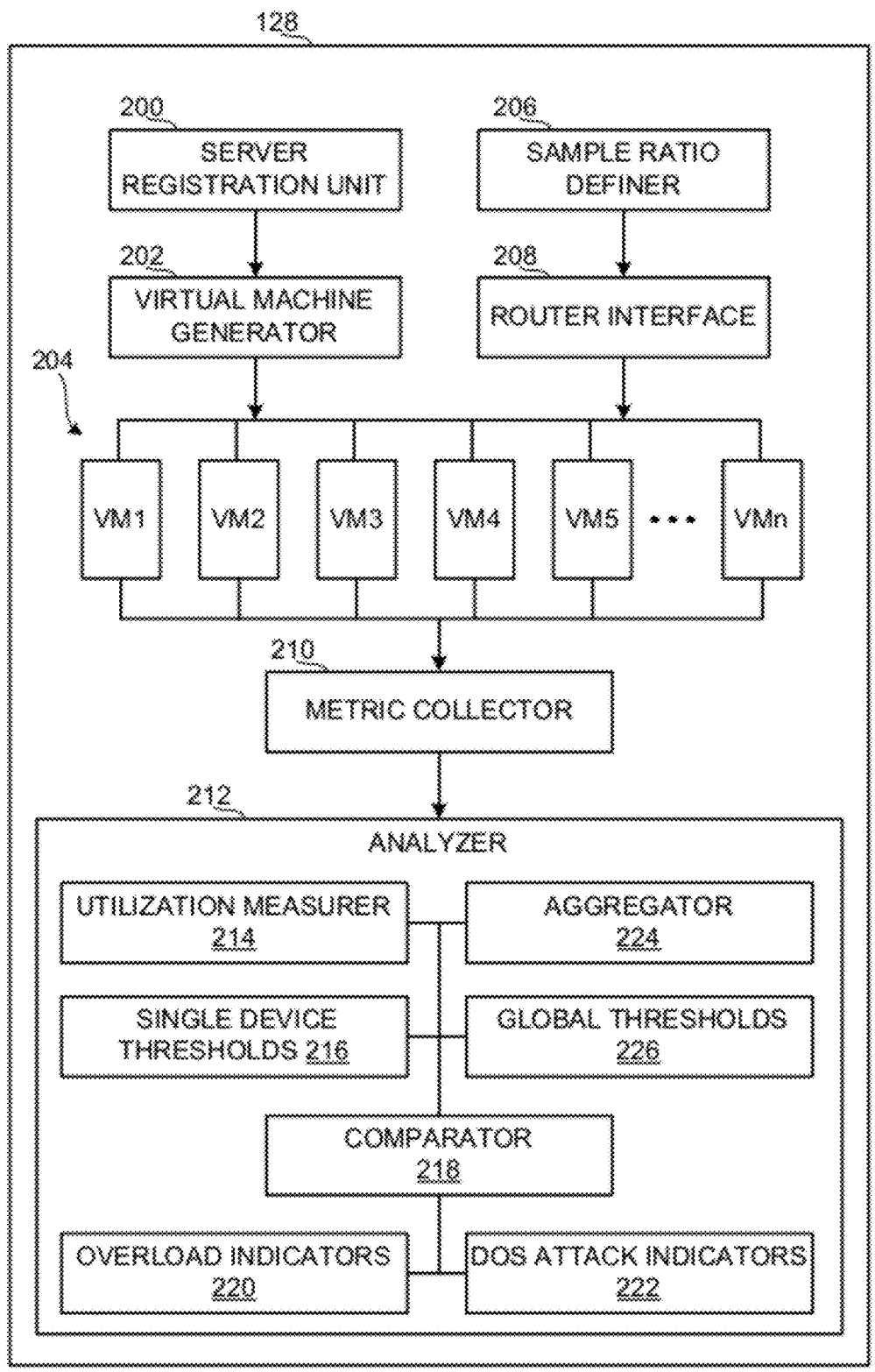
FIG. 2 is a block diagram of an example implementation of the example load monitor of FIG. 1.

FIG. 2 is a block diagram of an example implementation of the load monitor 128 of FIG. 1. The example load monitor of FIG. 2 includes a server registration unit 200 to register servers designated to be monitored by the example load monitor 128. When a server, such as a server 102a of the first server site 102 of FIG. 1, is to be monitored by the example load monitor 128, the example server registration unit 200 assigns an identifier to the server 102a. The assigned identifier can be used by the example load monitor 128 when, for example, performing one or more operations in connection with the corresponding server. Additionally, the example server registration unit 200 identifies and stores which of the edge routers 116-124 services the server 102a at the edge of the network 126. In the illustrated example, the servers 102a-c of the first site 102 are serviced by a third one 120 of the edge routers 116-124; the servers 104a-c of the second site 104 are serviced by a fourth one 122 of the edge routers 116-124; and the servers 106a-c of the third site 106 are serviced by a fifth one 124 of the edge routers 116-124. The example server registration unit 200 also obtains information related to aspects and/or characteristics of the server 102a such as, for example, software elements (e.g., operating system specifications), hardware elements (e.g., network communication device specifications, processor specifications, memory architecture, etc.), capabilities (e.g., processor speeds, amounts of volatile and/or non-volatile memory, etc.), etc.

A virtual machine generator 202 of the example load monitor of FIG. 2 receives the information obtained by the server registration unit 202 related to the server 102a and the identifier assigned to the server 102a. In some examples, the virtual machine generator 202 also communicates with the server 102a to obtain information in addition to the information obtained by the server registration unit 200. The example virtual machine generator 202 of FIG. 2 generates a virtual machine VM1 for the server 102a. The example virtual machine generator 202 of FIG. 2 generates a respective virtual machine VM1-VMn for each server registered with the example load monitor 128. The virtual machines are collectively labeled with reference numeral 204 in the illustrated example of FIG. 2. The example virtual machine generator 202 of FIG. 2 also associates each generated virtual machine with its corresponding server using, for example, the identifier assigned to each server by the server registration unit 200.

The example virtual machine generator 202 generates the virtual machines 204 such that each of the example virtual machines 204 is a virtual replica of a corresponding one of the servers. For example, a first virtual machine VM1 is a replica of the server 102a of the first service site 102 of FIG. 1. The first virtual machine VM1 is a replica in that the virtual machine VM1 emulates the operation of the server 102a and, thus, is able to service requests in a similar manner as the server 102a. Because the virtual machine VM1 services a request in a similar manner as the server 102a, a particular request imposes a similar processing load on the virtual machine VM1 as the processing load imposed on the server 102a by that same particular request. Thus, as described in detail below, the example load monitor 128 can use the virtual machine VM1 to infer load conditions of the server of the service site 102a by extrapolating the load conditions on the virtual machine VM1 to the load conditions on the server site 102a.

To route sample amounts of traffic destined for the server sites 102-106 to corresponding ones of the virtual machines 204, the example load monitor 128 of FIG. 2 includes a sample ratio definer 206 and a router interface 208. The example sample ratio definer 206 of FIG. 2 defines adjustable percentages of traffic to be redirected away from the server sites 102-106 and to the virtual machines 204. For example, the sample ratio definer 206 may define a first percentage, such as ten (10) percent, of requests destined for the first server 102a of the first site 102 to be redirected to the first virtual machine VM1 of the load monitor 128. Further, the example ratio definer 206 may define a second percentage, such as ten (10) percent, of requests destined for the second server 102b of the first site 102 to be redirected to a second virtual machine VM2 of the load monitor 128. Further, the example ratio definer 206 may define a third percentage, such as five (5) percent, of requests destined for the first server 104a of the second site 104 to be redirected to a third virtual machine VM3 of the load monitor 128. The example router interface 208 communicates the defined percentage for each registered server to the corresponding one of the edge routers 116-124. As described above, the server registration unit 200 identifies and stores which of the edge routers 116-124 services each router at the edge of the network 126. The example router interface 208 also instructs the appropriate edge router to redirect an amount of requests to the corresponding virtual machine in accordance with the defined sample ratio. To continue the above example, the router interface 208 instructs the third edge router 120 to redirect ten percent of service requests destined for the first server 102a of the first site 102 to the first virtual machine VM1 of the load monitor 128. Further, the example router interface 208 instructs the fourth edge router 122 to redirect ten percent of service requests destined for the second server 102b of the first site 102 to the second virtual machine VM2 of the load monitor 128. Further, the example router interface 208 instructs the fifth edge router 124 to redirect five percent of service requests destined for the first server 104a of the second site 104 to the third virtual machine VM3 of the load monitor 128.

The example load monitor 128 of FIG. 2 includes a metric collector 210 to collect metric data from the virtual machines 204 while the virtual machines 204 are servicing the redirected traffic (e.g., requests from the first and/or second client devices 108 and/or 110). The example metric collector 210 collects data indicative of a processing load placed on the virtual machines 204 such as, for example, a number of active sessions open, an available amount of memory, processor usage, a number of requests received during a period of time, etc. The amount and type(s) of metric data to be collected by the metric collector 210 of the illustrated example is adjustable and depends on, for example, the type of monitoring of the applicable server to be performed. That is, different metrics are indicative of different aspects of the processing load placed on a server. Accordingly, the metric collector 210 can be adjusted to collected different type(s) and amount(s) of metric data such that different aspect(s) of processing loads can be analyzed and/or relied upon to determine whether an overload condition is present.

In the illustrated example, the metric data collected by the metric collector 210 is conveyed to an analyzer 212 of the load monitor 128. The example analyzer 212 of FIG. 2 includes a utilization measurer 214 to determine an amount of virtual machine resources being consumed at a particular time or during a period of time of interest (e.g., the previous two minutes) by the request(s) that are redirected from the service site(s) 102-106 to the virtual machine(s) 204. For example, one (1) out of every ten (10) requests destined for the first server 102a of the first site 102 may be redirected to the first virtual machine VM1. Metric data is collected from the first virtual machine VM1 servicing those redirected requests. Using the collected metric data from the first virtual machine VM1, the utilization measurer 214 of FIG. 2 determines what portion of server capability or resources are currently being utilized during the period of time. For example, the utilization manager 214 of FIG. 1 can determine what portion of a central processing unit (CPU) capability and/or what portion of random access memory (RAM) of the first server 102a is being dedicated to servicing requests redirected to the first virtual machine VM1 by the edge router 120. The example load monitor 128 and the virtual machines 204 thereof enables the utilization measurer 214 to measure a flexible and scalable range and/or variety of metrics as the virtual machines 204 are replicas of the corresponding real servers and are managed on the load monitor 128 (and/or additional load monitors similar to the example load monitor 128 of FIG. 2).

The example load monitor 128 of FIG. 2 includes single device thresholds 216 that the analyzer 212 uses to determine whether one of the servers is overloaded and/or imminently will be overloaded. In the illustrated example, a comparator 218 of the analyzer 212 compares the single device thresholds 216 to the results of the utilization measurer 214. Thus, the single device thresholds 216 are set to levels corresponding to one or more overload conditions of the servers. An overload condition may indicate, for example, that an actual overload has occurred, that an overload condition will imminently occur, or that a potential for an overload condition exists. Each of the single device thresholds 216 corresponds to one of the virtual machines 204 and, thus, the server it represents. That is, each single device threshold 216 is customized for a corresponding one of the virtual machines 204. However, each of the virtual machines 204 may have more than one single device threshold 216 dedicated thereto when more than one overload condition is to be detected in a respective virtual machine. For instance, in the example of FIG. 2, a first one of the single device thresholds 216 corresponds to a first overload condition in the first virtual machine VM1, a second one of the single device thresholds 216 corresponds to a second overload condition in the first virtual machine VM1, and a third one of the single device thresholds 216 corresponds to a first overload condition in the second virtual machine VM2.

As an example, when the analyzer 212 is analyzing the first virtual machine VM1, the comparator 218 compares the utilization data measured by the utilization measurer 214 for the first virtual machine VM1 to the first one of the single device thresholds 216 corresponding to the first virtual machine VM1. If the portion of available resources being utilized by the first virtual machine VM1 exceeds the first single device threshold 216 (e.g., if a number of requests redirected to the first virtual machine VM1 from the first server 102a is high enough to degrade performance of the first virtual machine VM1), the first virtual machine VM1 is deemed to be in a first overload condition. If the portion of available resources being utilized by the first virtual machine VM1 exceeds the second single device threshold 216 (which is greater than the first single device threshold), the first virtual machine VM1 is deemed to be in a second overload condition more problematic than the first overload condition.

When an overload condition is detected by the comparator 218 in connection with one of the virtual machines 204, the example analyzer 212 of FIG. 2 activates or turns on one of a plurality of overload indicators 220 corresponding to the applicable one of the virtual machines 204. Thus, the example overload indicators 220 track which of the virtual machines 204 (and, thus, the servers they represent) are currently in an overload condition according to the analyzer 212. In the illustrated example, the load monitor 128 infers from the overload indicators 220 whether the corresponding servers are in an overload condition. As described above, because the virtual machines 204 service a percentage of the requests destined for the servers, and because the virtual machines 204 operate in a similar fashion as the corresponding servers, an overloaded virtual machine is indicative of the corresponding server also being overloaded.

In the illustrated example of FIG. 2, change(s) in the status of the overload indicators 220 are conveyed to the router interface 208. In some examples, the router interface 208 periodically or aperiodically checks the overload indicators 220 to determine whether any change in the status thereof has occurred. If the example router interface 208 determines that a first one of the overload indicators 220 indicates that a corresponding server is in an overload condition and/or is likely to enter an overload condition relatively soon, the example router interface 208 of FIG. 2 instructs the edge router servicing that server to reduce the processing load on that server. For example, if the router interface 208 determines that the first server 102a is in an overload condition (according to a corresponding one of the overload indicators 220), the example router interface 208 of FIG. 2 instructs the third edge router 120 to route at least some traffic destined for the first server 102a to a server (e.g., the second server 102b) of the first server site 102 and/or to a server (e.g., the first server 106a) of another server site (e.g., the third server site 106). In some examples, before instructing the edge router 120 to route at least some traffic to the relief servers (e.g., the second server 102b of the first server site 102 and/or the first server 106a of the third server site 106 in the above example), the router interface 208 verifies that the overload indicator(s) corresponding to the relief server(s) are not indicative of a overload condition in the relief server(s). As a result, overloaded servers of the system 100 are relieved of at least some processing load when those servers become burdened with high processing loads. Preferably, such relief occurs before a failure occurs due to overloading.

As explained above, at least some requests otherwise headed to an overloaded server are routed to and serviced by a server that is not overloaded. If the router interface 208 detects that the overload indicator 220 returns to an inactive or off state (indicating that the corresponding server is no longer in an overload condition), the example router interface 208 instructs the corresponding edge router 120 to return to routing requests destined for the previously overloaded server to that server (e.g., server 102a).

As shown in FIG. 1, a client device 110 can launch a DoS attack 114 on a server. To do so, the client device 110 sends an unusually high amount of requests to a targeted server, such as the third sever 106c of the third site 106. The single device thresholds 216 can include a DoS threshold that, if exceeded as determined by the comparator 218, indicates that the targeted server 106c is the subject of the DoS attack 114. In such instances, a DoS attack indicator 222 corresponding to the server 106c is activated or turned on in similar fashion as the overload indicators 220 explained above. The router interface 208 communicates with the DoS attack indicators 222 in a similar manner as the overload indicators 220 explained above to assist an attacked server in recovering from a high processing load.

The example analyzer 212 of FIG. 2 also includes an aggregator 224 to analyze a global processing load on one or more groups of servers. For example, the aggregator 224 can determine if the collection of the servers 102a-c of the first server site 102 are overloaded as a group. To do so, the example aggregator 224 collects and combines data generated by the utilization measurer 214 for each virtual machine associated with each server of a group of servers to be analyzed. Thus, the example aggregator 224 generates a measurement of the portion of collectively available virtual machine resources that are being consumed during a period of time by a processing load placed on the group of virtual machines by requests received from client devices. The example comparator 218 of FIG. 2 compares the measurements generated by the example aggregator 224 to one or more global thresholds 226. Similar to the single device thresholds 216, the example global thresholds 226 of FIG. 2 are set such that the utilization measurements of the aggregator 224 exceeding the global thresholds 226 is indicative of an overload condition for the corresponding group of virtual machines.

As an example, when the analyzer 212 is analyzing a group of virtual machines including the fourth, fifth and sixth virtual machines VM4, VM5 and VM6 corresponding to the first, second and third servers 104a-c of the second site 104, the comparator 218 compares the utilization data measured by the aggregator 224 for the virtual machines VM4-6 to a first one of the global thresholds 226 corresponding to the second site 104. If the portion of available resources being utilized by the fourth, fifth and sixth virtual machines VM4-6 exceeds the first global threshold 226 (e.g., if a number of requests redirected to the fourth, fifth and sixth virtual machines VM4-6, collectively, from the second site 104 is high enough to degrade performance of the fourth, fifth and sixth virtual machines VM4-6), the fourth, fifth and sixth virtual machines VM4-6, collectively, are deemed to be in an overload condition. If the portion of available resources being utilized by the fourth, fifth and sixth virtual machines VM4-6, collectively, exceeds a second global threshold 226 (which is greater than the first global threshold), the fourth, fifth and sixth virtual machines VM4-6, collectively, are deemed to be in a second overload condition which is typically more problematic than the first overload condition.

As with the single device thresholds 216, when an overload condition is detected by the comparator 218 in connection with global thresholds 226, the example analyzer 212 of FIG. 2 activates or turns on one of a plurality of overload indicators 220 corresponding to the applicable group of virtual machines 204. Thus, the example overload indicators 220 track which group(s) of virtual machines 204 are currently in an overload condition according to the analyzer 212. In the illustrated example, the load monitor 128 infers from the overload indicators 220 whether the corresponding groups of servers are in an overload condition. As described above, because the virtual machines 204 service a percentage of the requests destined for corresponding ones of the servers, and because the virtual machines 204 operate in a similar fashion as the corresponding servers, an overloaded group of virtual machines is indicative of the corresponding group of servers also being overloaded. In some examples, more than one global threshold may be employed to track more than one type of resource for overload. Further, an actual overload may be deemed to have occurred when only one of the overload conditions is detected or an actual overload may be deemed to have occurred when some combination of overload conditions occurs.

If the example router interface 208 determines that one of the overload indicators 220 indicates that a corresponding group of servers is in an overload condition and/or is likely to enter an overload condition relatively soon, the example router interface 208 of FIG. 2 instructs the edge router servicing that group of servers to reduce the processing load on that group of servers. For example, if the router interface 208 determines that the second site 104 is in an overload condition (according to a corresponding one of the overload indicators 220), the example router interface 208 of FIG. 2 instructs the fourth edge router 122 to route at least some traffic destined for the second site 104 to the third site 106 and/or the first site 102. In some examples, before instructing the edge router 120 to route at least some traffic to the relief group of servers (e.g., the third site 106 and/or the first site 102 in the above example), the router interface 208 verifies that the overload indicator(s) corresponding to the relief group of servers is not indicative of a overload condition in the relief group of servers and/or that the re-routing will not cause an overload condition. As a result, overloaded groups of servers of the system 100 are relieved of at least some processing load when those groups of servers become burdened with high processing loads. Moreover, at least some requests otherwise headed to an overloaded group of servers are routed to and serviced by a group of servers that is not overloaded. If the router interface 208 detects that the active or on overload indicator 220 returns to an inactive or off state (indicating that the corresponding group of servers is no longer in an overload condition), the example router interface 208 instructs the corresponding edge router 120 to return to routing the requests destined for the previously overloaded group of servers to that group of servers. The router interface 208 can utilize and/or implement additional or alternative techniques of re-routing requests in response to overload condition(s). For example, varying amounts of requests can be redirected depending on factors such as percentages associated with loads on each server and how much redirected traffic server(s) can handle without causing additional overload condition(s).

The groups of servers monitored via the example aggregator 224 and the global thresholds 226 can also be targeted by the example DoS attack 114. Accordingly, the example DoS attack indicators 222 also include indicators corresponding to higher global thresholds 226 being exceeded by the measurements generated by the aggregator 224. In such instances, a DoS attack indicator 222 corresponding to the group of servers being analyzed is activated or turned on in similar fashion as the overload indicators 220. The router interface 208 communicates with the DoS attack indicators 222 in a similar manner as the overload indicators 220 to assist an attacked group of servers in recovering from a high processing load.

While an example manner of implementing the load monitor 128 of FIG. 1 has been illustrated in FIG. 2, one or more of the elements, processes and/or devices illustrated in FIG. 2 may be combined, divided, re-arranged, omitted, eliminated and/or implemented in any other way. Further, the example server registration unit 200, the example virtual machine generator 202, the example virtual machine(s) 204, the example sample ratio definer 206, the example router interface 208, the example metric collector 210, the example metric analyzer 212, the example utilization measurer 214, the example single device thresholds 216, the example comparator 218, the example overload indicator 220, the example DoS attack indicator 222, the example aggregator 224, the example global thresholds 226, and/or, more generally, the example load monitor 128 of FIG. 2 may be implemented by hardware, software, firmware and/or any combination of hardware, software and/or firmware. Thus, for example, any of the example server registration unit 200, the example virtual machine generator 202, the example virtual machine(s) 204, the example sample ratio definer 206, the example router interface 208, the example metric collector 210, the example metric analyzer 212, the example utilization measurer 214, the example single device thresholds 216, the example comparator 218, the example overload indicator 220, the example DoS attack indicator 222, the example aggregator 224, the example global thresholds 226, and/or, more generally, the example load monitor 128 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example server registration unit 200, the example virtual machine generator 202, the example virtual machine(s) 204, the example sample ratio definer 206, the example router interface 208, the example metric collector 210, the example metric analyzer 212, the example utilization measurer 214, the example single device thresholds 216, the example comparator 218, the example overload indicator 220, the example DoS attack indicator 222, the example aggregator 224, the example global thresholds 226, and/or, more generally, the example load monitor 128 of FIG. 2 are hereby expressly defined to include a tangible computer readable medium such as a memory, DVD, CD, etc. storing the software and/or firmware. Further still, the example load monitor 128 of FIG. 2 may include one or more elements, processes and/or devices in addition to, or instead of, those illustrated in FIG. 2, and/or may include more than one of any or all of the illustrated elements, processes and devices.

FIGS. 3-6 are flowcharts representative of example machine readable instructions for implementing the example load monitor 128 of FIGS. 1 and/or 2. In this example, the machine readable instructions comprise a program for execution by a processor such as the processor 712 shown in the example computer 700 discussed below in connection with FIG. 7. The program may be embodied in software stored on a computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program are described with reference to the flowcharts illustrated in FIGS. 3-6, many other methods of implementing the example load monitor may alternatively be used. For example, the order of execution of the blocks may be changed, and/or some of the blocks described may be changed, eliminated, or combined.

As mentioned above, the example processes of FIGS. 3-6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 3:
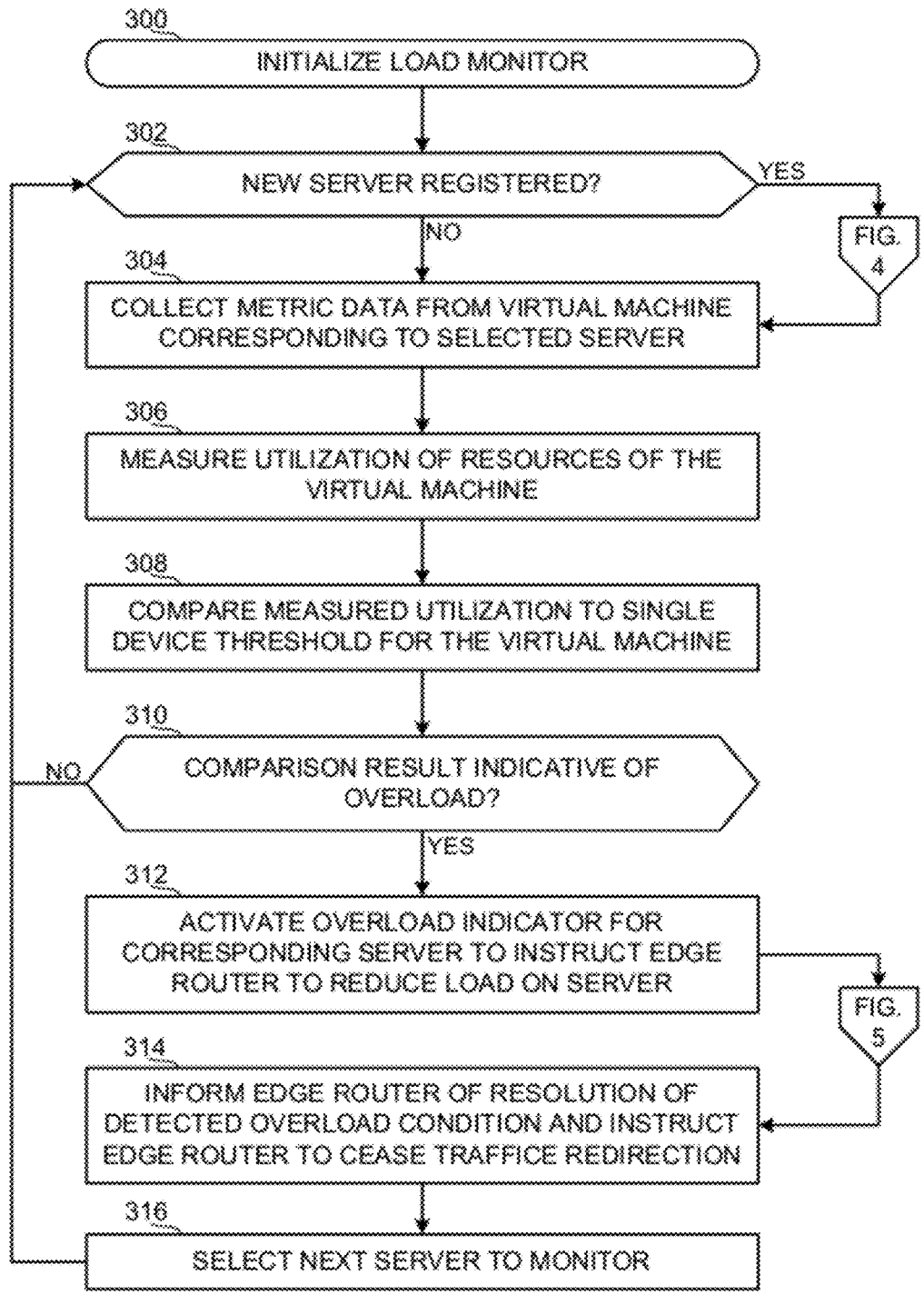
FIGS. 3-6 are flowcharts illustrating example machine readable instructions that may be executed to implement the example load monitor of FIGS. 1 and/or 2.
Figure 4:
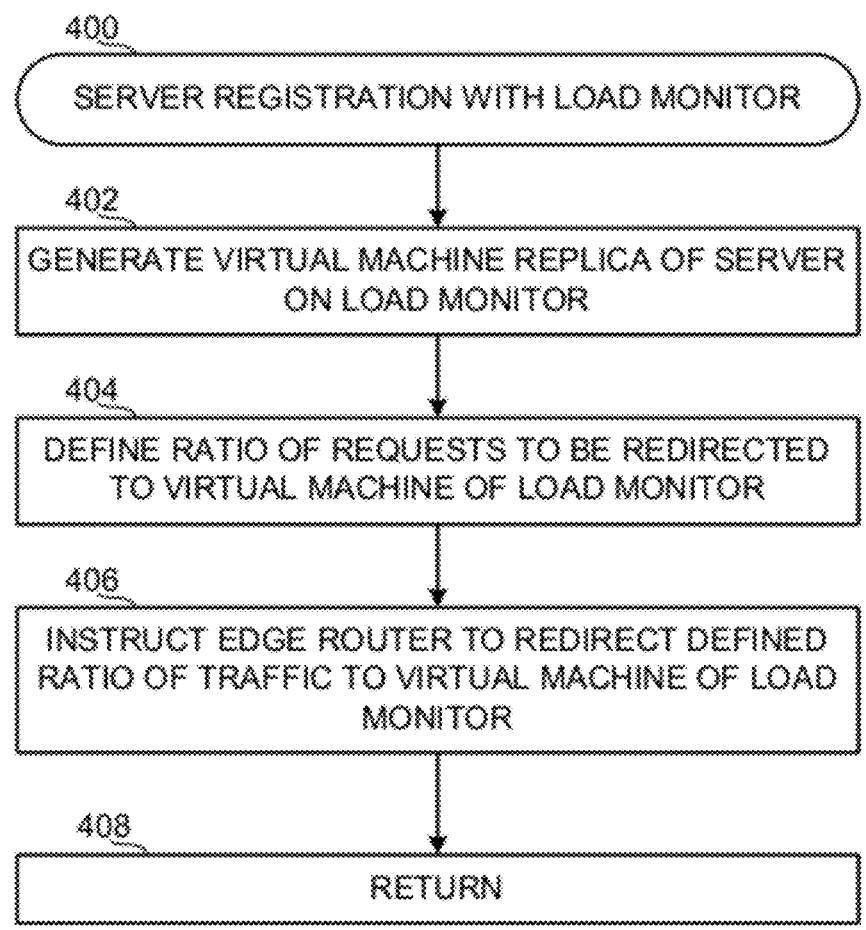

The flowchart of FIG. 3 begins with an initialization of the example load monitor 128 of FIGS. 1 and/or 2 (block 300). The load monitor 128 is initialized when, for example, the load monitor 128 is scheduled to begin monitoring one or more servers of the example network 126 of FIG. 1. The example load monitor 128 receives registration requests from servers that desire and/or are designated to be monitored by the load monitor 128. When the load monitor 128 receives registration requests (block 302), control passes to FIG. 4. The server registration unit 200 receives the registration requests and proceeds to register the requesting server with the load monitor 128 (block 400). As part of the registration process, the registration unit 200 gathers information about the requesting server and assigns an identifier to the requesting server. The virtual machine generator 202 then generates a virtual machine replica of the server that services processing requests in a similar fashion as the corresponding server (block 402). The sample ratio definer 204 defines a ratio of requests destined for the server to be redirected to the corresponding virtual machine (block 404). The router interface 208 instructs the edge router servicing the server to redirect the defined ratio or percentage of traffic destined for the server to the corresponding virtual machine (block 406). Control then returns to FIG. 3 (block 408).

The metric collector 210 then collects metric data from a selected one of the virtual machines 204 while the selected virtual machine services requests redirected to the selected virtual machine from the corresponding server (block 304). The data collected (e.g., a number of active sessions are open, an available amount of memory, processor usage, a number of requests received during a period of time, etc.) is indicative of a processing load placed on the selected virtual machines. The utilization measurer 214 determines an amount of virtual machine resources being consumed at a particular time or during a period of time by the requests that are redirected from the corresponding server (block 306). This determination or determination(s) may reflect a peak usage value, an average usage value, or any other type of metric. The comparator 218 compares the amount of virtual machine resources being consumed by the redirected requests to one of the thresholds 216 to determine whether the selected virtual machine is overloaded and/or imminently will be overloaded (block 308). The threshold 216 may reflect a threshold percentage of resources such as ninety percent (90%), etc. at which the corresponding server should be considered overloaded to avoid failure. In the illustrated example, the single device threshold 216 to which the results of the utilization measurer 214 is compared corresponds to an overload condition. In some examples, the comparator 218 compares the amount of virtual machine resources being consumed by the redirected requests to additional or alternative ones of the single device thresholds 216, such as a threshold corresponding to a potential DoS attack.

When the amount or percentage of available resources of the selected virtual machine being consumed exceeds the single device threshold(s) 216 (block 310), corresponding overload indicator(s) 220 are activated because the selected virtual machine is deemed to be in one or more overload condition(s) (block 312). In the illustrated example, more than one overload condition can be tracked at a given time based on one or more metrics (e.g., processor burden, memory availability, etc.). Otherwise control returns to block 302. As described above, the activation of the overload indicator(s) 220 causes the router interface 208 to instruct the edge router servicing the server corresponding to the selected virtual machine to reduce the processing load on that server (block 312).

Figure 5:
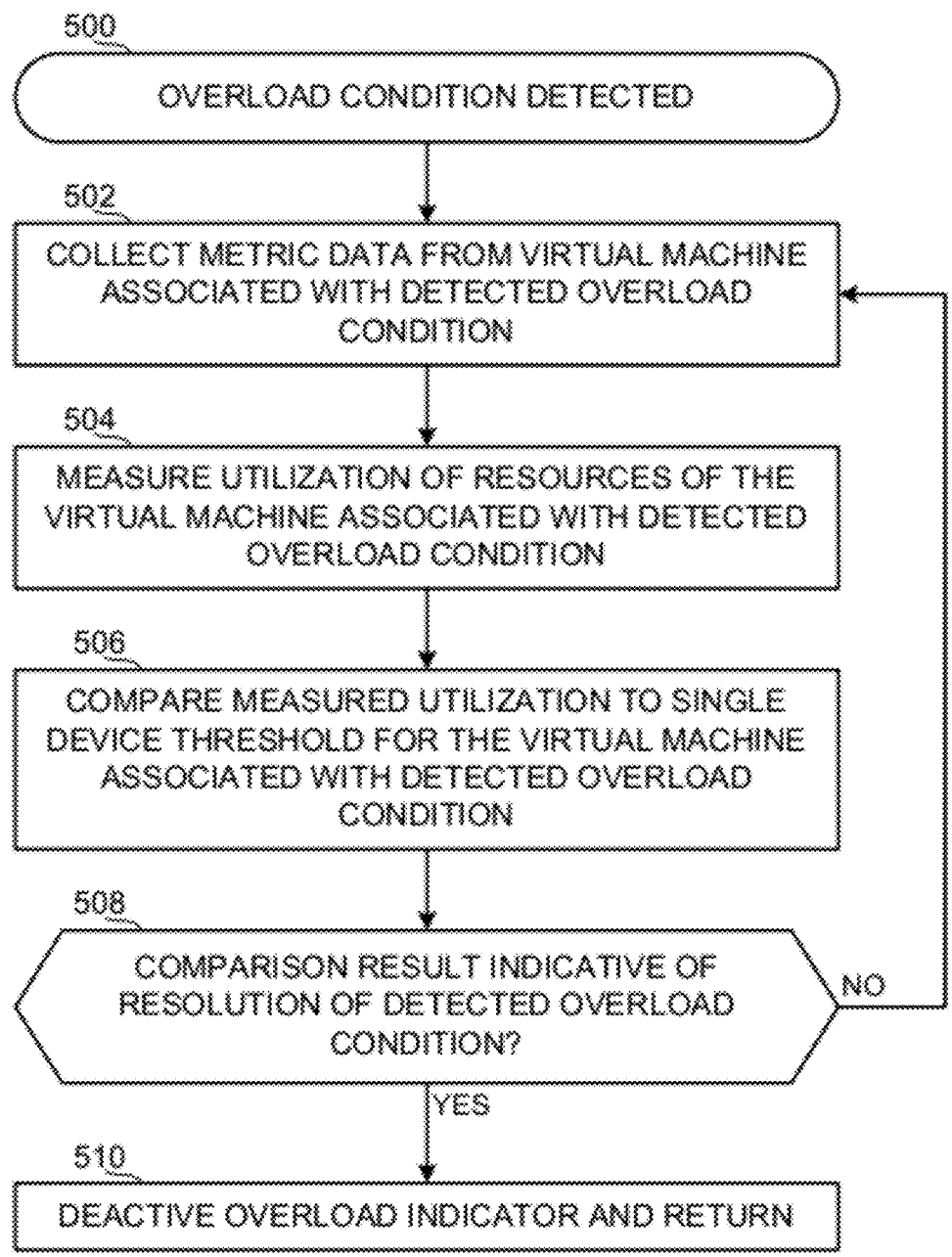

In the illustrated example, control passes to FIG. 5. In the example of FIG. 5, an overload condition has been detected in connection with the selected server (block 505). As a result, the edge router interface 208 has caused a rerouting of at least some traffic away from the server corresponding to the selected virtual machine. To determine whether the server has recovered from the overload condition, the metric collector 210 collects metric data from the selected virtual machine (block 502). The utilization measurer 212 determines what portion(s) of one or more available resources of the selected virtual machine are being consumed (block 504). The comparator 214 compares the measured utilization of the selected virtual machine to the threshold 216 that was exceeded in the earlier comparison at block 308 (block 506). When the comparison results indicate that the overload condition(s) have not resolved (i.e., the utilization measurement still exceeds the threshold) (block 508), control returns to block 502 and the processing load on the selected virtual machine is checked again for the overload condition. On the other hand, when the comparison results of block 506 indicate that the overload condition(s) have resolved (block 508), the corresponding overload indicator(s) 220 are deactivated to indicate that the detected overload condition(s) no longer exists (block 510). Control then returns to block 314 of FIG. 3.

The router interface informs the edge router of the resolution of the detected overload condition(s) in the server corresponding to the selected virtual machine (block 314). The router interface 208 instructs the edge router to return to the previous routing configuration such that traffic destined for the server is routed thereto (block 314). Another server and, therefore, another one of the virtual machines 204 is selected for analysis (block 316) and control returns to block 302. Additionally or alternatively, multiple instances of the program(s)/routine(s) represented by FIGS. 3-5 could be executed in parallel (e.g., as parallel threads) to monitor multiple virtual machines 204 in parallel.

Figure 6:
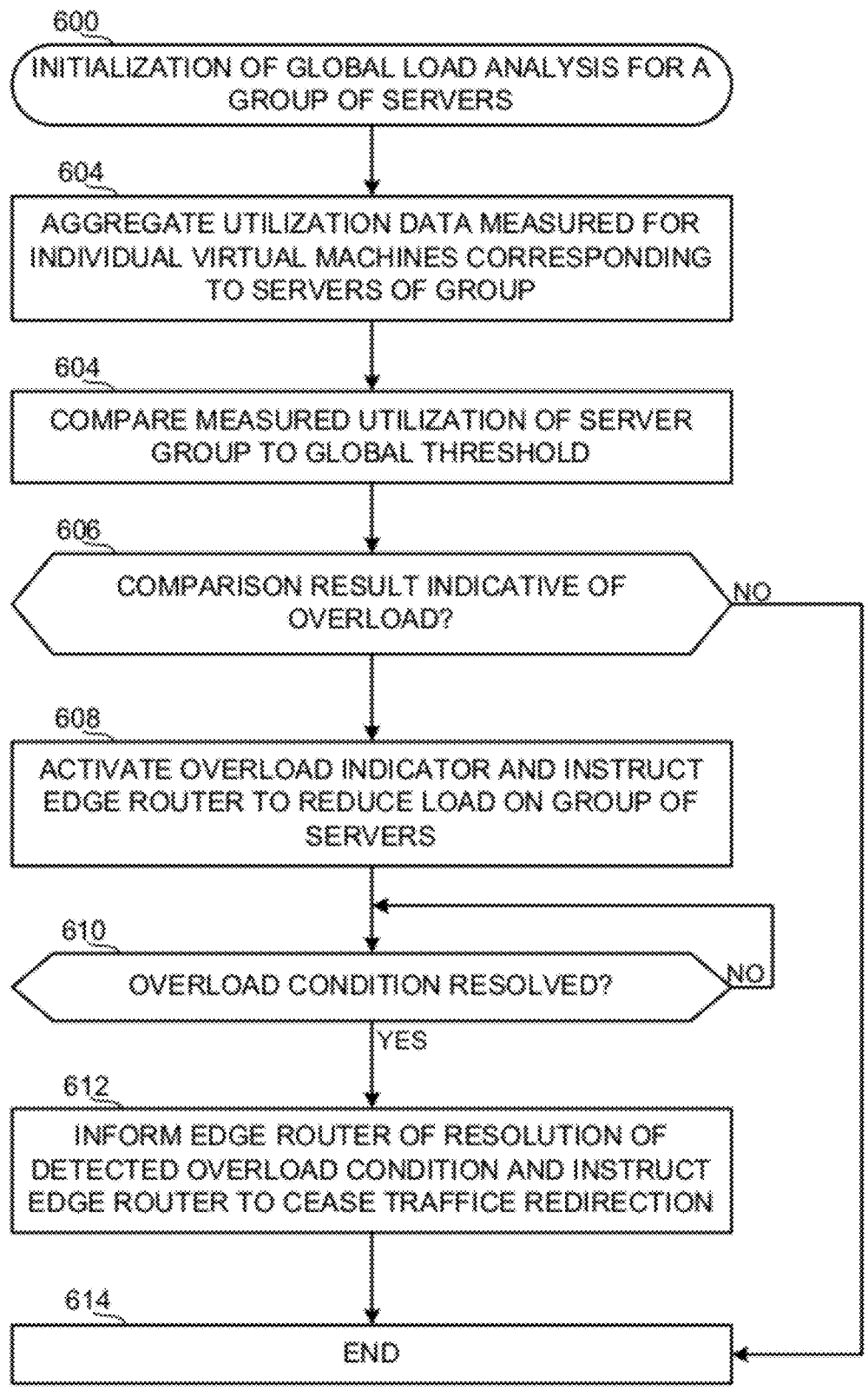

FIG. 6 begins with an initialization of a global load analysis for a group of servers, such as the second service site 10 of FIG. 1 (block 600). The global load analysis may be initialized by, for example, a user of the load monitor 128 and/or according to a schedule. The aggregator 224 of the load monitor 128 combines or aggregates data generated by the utilization measurer 214 for each virtual machine associated with each server of the group of servers (block 602). That is, the aggregator 224 generates a measurement of the portion of collectively available virtual machine resources that are being consumed during a period of time by a processing load placed on the group of virtual machines by requests received from client devices. The comparator 218 of FIG. 2 compares the aggregate utilization measurement(s) to one(s) of the global thresholds 226 that corresponds to that group of servers (block 604).

When a portion of the monitored available resources being utilized by the virtual machines, collectively, corresponding to the group of servers exceeds a corresponding global threshold 226 (block 606), the group of serves is deemed to be in an overload condition. As mentioned above, more than one global threshold may be employed to track more than one type of resource for overload. Further, an actual overload may be deemed to have occurred when only one of the overload conditions is detected or an actual overload may be deemed to have occurred when some combination of overload conditions occurs. The example analyzer 212 activates or turns the overload indicator 220 corresponding to the applicable group of virtual machines 204 and the router interface 208 instructs the edge router servicing that group of servers to reduce the processing load on that group of servers. For example, the router interface 208 may instruct the edge router 122 of FIG. 1 to reroute traffic to the third site 106 when the second site 104 is in an overload condition. When the router interface 208 detects that the active or on overload indicator 220 returns to an inactive or off state (block 610), the example router interface 208 instructs the corresponding edge router to return to routing the requests destined for the previously overloaded group of servers to that group of servers (block 612). The example of FIG. 6 then ends (block 614).

Figure 7:
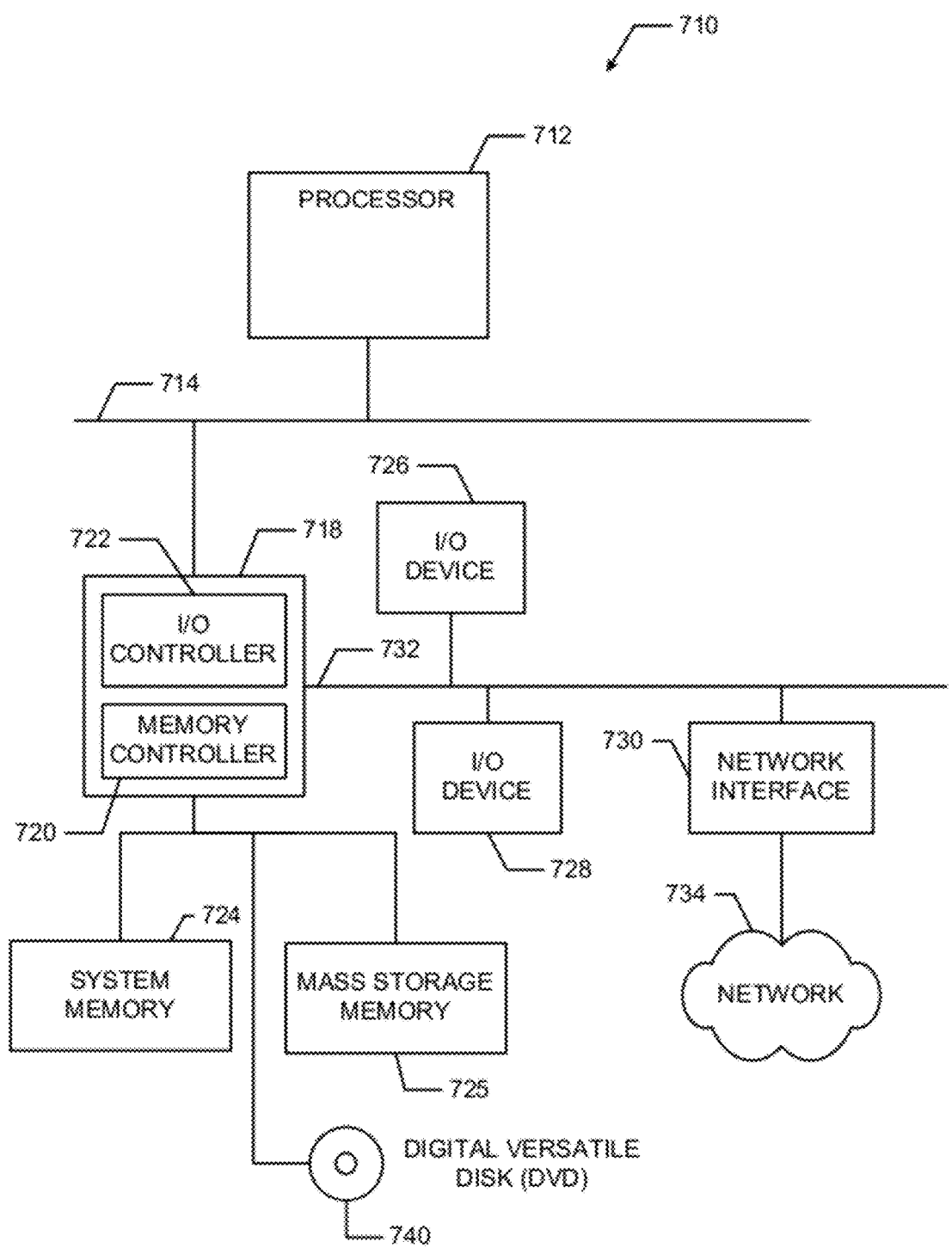
FIG. 7 is a block diagram of an example processing system capable of executing the example machine readable instructions of FIGS. 3-6 to implement the example load monitor of FIGS. 1 and/or 2.

FIG. 7 is a block diagram of an example processor system 710 that may be used to execute the machine readable instructions of FIGS. 3-6 to implement the example load monitor 128 of FIGS. 1 and/or 2.

The example processor system 710 of FIG. 7 includes a processor 712 that is coupled to an interconnection bus 714. The processor 712 may be any suitable processor, processing unit, or microprocessor (e.g., one or more Intel® microprocessors from the Pentium® family, the Itanium® family or the XScale® family and/or other processors from other families). The system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 to access a system memory 724, a mass storage memory 725, and/or a digital versatile disk (DVD) 740.

In general, the system memory 724 may include any desired type of volatile and/or non-volatile memory such as, for example, static random access memory (SRAM), dynamic random access memory (DRAM), flash memory, read-only memory (ROM), etc. The mass storage memory 25 may include any desired type of mass storage device including hard disk drives, optical drives, tape storage devices, etc. The machine readable instructions of FIGS. 3, 4, 5, and/or 6 may be stored in the system memory 724, the mass storage memory 725, and/or the DVD 740.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a digital subscriber line (DSL) modem, a cable modem, a cellular modem, etc. that enables the processor system 710 to communicate with another processor system. The example network interface 7630 of FIG. 7 is also communicatively coupled to a network 734, such as an intranet, a Local Area Network, a Wide Area Network, the Internet, etc.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A computing device, comprising:
   a processor; and
   memory comprising machine executable instructions which, when executed, cause the processor to perform operations comprising:
   executing a first virtual machine to replicate a first server on the processor, the computing device being a different computing device than the first server;
   serving redirected requests originally destined for the first server with the first virtual machine;
   collecting first metric data related to processing the redirected requests, the first metric data being collected by the first virtual machine while the first virtual machine is executing on the processor; and generating an indication that the first server is overloaded based on the first metric data collected from the first virtual machine.

2. A computing device as defined in claim 1, wherein the operations further include measuring a percentage of a processing resource of the first virtual machine that is being consumed during a period of time by the redirected requests.

3. A computing device as defined in claim 2, wherein the operations further include comparing the percentage of the processing resource to a first threshold, and generating the indication that the first server is overloaded when the percentage of the processing resource satisfies the first threshold.

4. A computing device as defined in claim 3, wherein the operations further include comparing the percentage of the processing resource to a second threshold greater than the first threshold, and generating a second indication of a denial of service attack to indicate a potential denial of service attack on the first server when the percentage of the processing resource satisfies the second threshold.

5. A computing device as defined in claim 1, wherein the operations further include issuing an instruction to reduce a load on the first server in response to the indication that the first server is overloaded.

6. A computing device as defined in claim 1, wherein the operations further include executing a second virtual machine configured as a replica of a second server different from the first server, and collecting second metric data from the second virtual machine related to processing of requests redirected to the second virtual machine from the second server.

7. A computing device as defined in claim 6, wherein the operations further include combining the first and second metric data into combined data.

8. A computing device as defined in claim 7, wherein the operations further include analyzing the combined data to determine a global load of the first and second servers.

9. A method, comprising:
accessing redirected requests originally destined for a server at a virtual machine replicating the server, the virtual machine to serve the redirected requests in place of the server, the virtual machine executing on a machine different than the server;
collecting, with the virtual machine, metric data related to processing of the redirected requests while the virtual machine executes on the machine different than the server; and
indicating that the server is overloaded based on the metric data collected with the virtual machine.

10. A method as defined in claim 9, further including measuring a percentage of a processing resource of the virtual machine that is being consumed by the redirected requests.

11. A method as defined in claim 10, further including comparing the percentage of the processing resource to a first threshold, and wherein indicating that the server is overloaded occurs when the percentage of the processing resource satisfies the first threshold.

12. A method as defined in claim 11, further including comparing the percentage of the processing resource to a second threshold greater than the first threshold, and indicating a potential denial of service attack on the server when the percentage of the processing resource satisfies the second threshold.

13. A method as defined in claim 9, further including issuing an instruction to reduce a load on the server in response to the indicating that the server is overloaded.

14. A method as defined in claim 13, further including issuing a second instruction to cease reducing the load on the server when a condition associated with the server being overloaded has resolved.

15. A tangible computer readable medium comprising machine executable instructions that, when executed, cause a virtual machine replicating a server on a computing device different than the server to perform operations comprising:
accessing redirected requests originally destined for the server
serving the redirected requests in place of the server;
collecting metric data while the virtual machine executes on the computing device different than the server, the metric data related to processing of the redirected requests; and
indicating that the server is overloaded based on the metric data collected with the virtual machine.

16. A computer readable medium as defined in claim 15, wherein the operations further include measuring a percentage of a processing resource of the virtual machine that is being consumed by the redirected requests.

17. A computer readable medium as defined in claim 16, wherein the operations further include comparing the percentage of the processing resource to a first threshold, and wherein indicating that the server is overloaded occurs when the percentage of processing resource satisfies the first threshold.

18. A computer readable medium as defined in claim 17, wherein the operations further include comparing the percentage of the processing resource to a second threshold greater than the first threshold, and indicating a potential denial of service attack on the server when the percentage of the processing resource satisfies the second threshold.

19. A computer readable medium as defined in claim 15, wherein the operations further include issuing an instruction to reduce a load on the server in response to the indicating that the server is overloaded.

20. A computer readable medium as defined in claim 19, wherein the operations further include issuing a second instruction to cease reducing the load on the server when a condition associated with the overload has resolved.

* * * * *